United States Patent
Uno et al.

(10) Patent No.: US 11,059,998 B2
(45) Date of Patent: Jul. 13, 2021

(54) WATERPROOF SHEET AND WATERPROOFING METHOD INCLUDING USING SAME

(71) Applicant: SHIN-ETSU CHEMICAL CO., LTD., Tokyo (JP)

(72) Inventors: Takao Uno, Annaka (JP); Hisaharu Yamaguchi, Annaka (JP); Masahiro Yoda, Annaka (JP); Takeshi Nakajima, Tokyo (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 362 days.

(21) Appl. No.: 15/759,287

(22) PCT Filed: Jul. 27, 2016

(86) PCT No.: PCT/JP2016/072050
§ 371 (c)(1),
(2) Date: Mar. 12, 2018

(87) PCT Pub. No.: WO2017/056667
PCT Pub. Date: Apr. 6, 2017

(65) Prior Publication Data
US 2018/0251661 A1    Sep. 6, 2018

(30) Foreign Application Priority Data
Sep. 28, 2015  (JP) .............................. JP2015-189826

(51) Int. Cl.
*C09J 7/25*    (2018.01)
*B29C 65/48*    (2006.01)
(Continued)

(52) U.S. Cl.
CPC ............. *C09J 7/25* (2018.01); *B29C 65/4825* (2013.01); *B29C 66/72141* (2013.01);
(Continued)

(58) Field of Classification Search
None
See application file for complete search history.

(56) References Cited

U.S. PATENT DOCUMENTS

| 2012/0247033 A1 | 10/2012 | Nakajima et al. |
| 2014/0090771 A1 | 4/2014 | Uno et al. |
| 2015/0267399 A1 | 9/2015 | Uno et al. |

FOREIGN PATENT DOCUMENTS

| EP | 0 506 195 A1 | 9/1992 |
| EP | 2 505 629 A1 | 10/2012 |

(Continued)

OTHER PUBLICATIONS

Machine translation of JPS5589624 (Year: 1980).*

(Continued)

*Primary Examiner* — Shawn Mckinnon
(74) *Attorney, Agent, or Firm* — Birch, Stewart, Kolasch & Birch, LLP (57) ABSTRACT

A waterproof sheet which is for application to a site to be waterproofed in order to prevent rainwater infiltration thereinto and retard deteriorations which proceed with time, the waterproof sheet comprising: a base layer that comprises a silicone rubber composition reinforced with reinforcing fibers and that has physical properties including high strength; and a pressure-sensitive silicone adhesive layer that has been formed on one surface of the base layer and that has a low hardness and is highly tacky. The waterproof sheet provided by the present invention less breaks than conventional waterproof sheets because of the reinforcement layer, and can conform to cracks or dislocations occurring in the surfaces to which the waterproof sheet has been applied, due to the pressure-sensitive adhesive layer formed on one surface. Since the waterproof sheet includes silicones as main components and is hence excellent in terms of weatherability, heat resistance, and freeze resis- (Continued)

tance, this waterproof sheet can retain the function required of waterproof sheets, over a longer period.

11 Claims, 2 Drawing Sheets

(51) Int. Cl.
| | |
|---|---|
| B29C 65/00 | (2006.01) |
| C09J 9/00 | (2006.01) |
| E01D 19/10 | (2006.01) |
| E01C 11/02 | (2006.01) |
| E04B 1/68 | (2006.01) |
| C09J 183/04 | (2006.01) |
| B32B 25/20 | (2006.01) |
| E04D 5/10 | (2006.01) |
| B32B 5/02 | (2006.01) |
| E01C 11/10 | (2006.01) |
| B32B 7/12 | (2006.01) |
| B32B 27/08 | (2006.01) |
| B32B 25/10 | (2006.01) |
| B65D 90/06 | (2006.01) |
| E02D 27/38 | (2006.01) |
| B29K 83/00 | (2006.01) |
| B29K 105/08 | (2006.01) |
| C08K 7/02 | (2006.01) |
| C08K 7/14 | (2006.01) |

(52) U.S. Cl.
CPC .............. *B32B 5/024* (2013.01); *B32B 7/12* (2013.01); *B32B 25/10* (2013.01); *B32B 25/20* (2013.01); *B32B 27/08* (2013.01); *B65D 90/06* (2013.01); *C09J 9/00* (2013.01); *C09J 183/04* (2013.01); *E01C 11/02* (2013.01); *E01C 11/10* (2013.01); *E01D 19/10* (2013.01); *E01D 19/103* (2013.01); *E02D 27/38* (2013.01); *E04B 1/6803* (2013.01); *E04D 5/10* (2013.01); *B29K 2083/00* (2013.01); *B29K 2105/0845* (2013.01); *B29K 2995/0069* (2013.01); *B32B 2255/10* (2013.01); *B32B 2262/0269* (2013.01); *B32B 2262/10* (2013.01); *B32B 2262/101* (2013.01); *B32B 2262/106* (2013.01); *B32B 2307/412* (2013.01); *B32B 2307/50* (2013.01); *B32B 2307/536* (2013.01); *B32B 2307/54* (2013.01); *B32B 2307/582* (2013.01); *B32B 2307/5825* (2013.01); *B32B 2307/712* (2013.01); *B32B 2307/7265* (2013.01); *B32B 2307/732* (2013.01); *B32B 2419/00* (2013.01); *C08K 7/02* (2013.01); *C08K 7/14* (2013.01); *C09J 2301/122* (2020.08); *C09J 2301/302* (2020.08); *C09J 2301/41* (2020.08); *C09J 2400/143* (2013.01); *C09J 2483/00* (2013.01); *C09J 2483/006* (2013.01)

(56) References Cited

FOREIGN PATENT DOCUMENTS

| | | |
|---|---|---|
| EP | 2 907 934 A1 | 8/2015 |
| EP | 2 915 762 A1 | 9/2015 |
| JP | 55-89624 U | 6/1980 |
| JP | S5589624 * | 6/1980 |
| JP | 8-281879 A | 10/1996 |
| JP | 2000-119404 A | 4/2000 |
| JP | 3197459 B2 | 8/2001 |
| JP | 2001-239616 A | 9/2001 |
| JP | 2001-314831 A | 11/2001 |
| JP | 2011-7030 A | 1/2011 |
| JP | 2012-215057 A | 11/2012 |
| JP | 2014-70482 A | 4/2014 |
| WO | WO 2014/061344 A1 | 4/2014 |
| WO | WO2014061344 * | 4/2014 |

OTHER PUBLICATIONS

Machine translation of WO2014061344 (Year: 2014).*
Extended European Search Report issued in European Patent Application No. 16850844.8 dated Mar. 14, 2019.
International Search Report, issued in PCT/JP2016/072050, dated Oct. 11, 2016.
Written Opinion of the International Searching Authority, issued in PCT/JP2016/072050, dated Oct. 11, 2016.
Taiwanese Office Action issued in the corresponding Taiwanese Patent Application No. 105125944 dated Apr. 30, 2020.

* cited by examiner

WATERPROOF SHEET AND WATERPROOFING METHOD INCLUDING USING SAME

TECHNICAL FIELD

The present invention relates to a waterproof sheet of high-strength physical characteristics which, by liquid-tight attachment so as to cover at least part of an object at places that require waterproofing in, for example, drainage constructions or drainage facilities that include at least one type of structure from among concrete, mortar and metal structures, or in buildings, including, for example, the edges of structures built so that rainwater escapes though expansion gaps on a roadway, railroad or the like, factories and ordinary houses, can be effectively used to prevent moisture infiltration and guard against deterioration of the object or to retard the progress of deterioration over time. The invention also relates to a method of waterproofing that uses the waterproof sheet.

BACKGROUND ART

On ordinary roads, highways and railroads, including bridges and tunnels, various measures are taken to keep rainwater from collecting on the road surface. For example, in one approach employed on roads, a drainage ditch or conduit is placed near the road shoulder and the road is gently sloped toward the shoulder so as to cause rainwater to flow toward the shoulder side and off the road. Another approach that is used provides joints in, for example, expansion gaps on the roadway or between a bridge and the normal road surface such that rainwater is discharged through the joints. Many types of such structures exist, including ones made of steel and others made of concrete, although there is a concern that, owing to the effects of moisture, these tend to undergo deterioration such as rust formation, loss of strength, and the peeling/falling off of material from the structure more readily than in other places.

When waterproofing is the primary aim, waterproofing treatment is carried out to prevent moisture infiltration into the above structure. The treatment method involves using a reinforced sheet for waterproofing. According to Patent Document 1, an uncured butyl rubber mixture is applied and bonded to a reinforced sheet and the solvent is evaporated off, thus forming a rubber mixture having a film with a higher filler ratio on the outer surface, and a concrete wall is formed on the outer surface side. The reinforced sheet and the concrete wall are bonded together and integrally united by the rubber mixture. Although it is possible in this way to obtain a cut-off wall of high mechanical strength for covering a to deep underground concrete barrier, this method is intended for large-scale operations.

In Patent Document 2, a composite waterproof sheet in which a fiber-reinforced thermoplastic resin sheet serves as the waterproof layer is used for asphalt waterproofing reservoirs, riverbank works, pools, and sanitary landfills. The waterproof layer is composed of synthetic resin, butyl rubber, asphalt or the like as the matrix, and includes reinforcing fibers, a thermoplastic resin and a buffer layer. The reinforcing fibers are included in a volumetric content of 30 to 85% and consist of unidirectional filaments. Use entails layering together from two to ten sheets, making installation complicated.

Additionally, in Patent Document 3, a fiber-reinforced plastic (FRP) waterproof sheet is used. But this requires the step of preparing to a certain degree of roughness the surface at both edges near the joint where the sheet is to be placed. In Patent Document 4, a sealing sheet composed of reinforcing fibers embedded in an asphalt sheet is used. However, this must be laid in close contact with the surface on which it is placed so that air is not caught in between. Installation thus requires skill and experience.

Waterproofing is not easy with any of these approaches. Moreover, the sheet itself, being reinforced, lacks stretchability and thus does not readily conform to cracking and shifting of the installed surface from earthquakes, etc., or to shifting due to shrinkage and expansion on account of warming and cooling. As a result, with long-term use, there is a possibility that the waterproof sheet itself may shift with respect to the surface on which it is installed or may be damaged.

PRIOR ART DOCUMENTS

Patent Documents

Patent Document 1: JP-A 2011-007030
Patent Document 2: JP No. 3197459
Patent Document 3: JP-A 2000-119404
Patent Document 4: JP-A 2001-314831

SUMMARY OF INVENTION

Technical Problem

It is therefore an object of this invention to provide a waterproof sheet that is resistant to damage and capable of conforming to cracking and shifting of the surface on which the sheet is installed. Another object is to provide a waterproofing method that uses this sheet.

Solution to Problem

The inventors have conducted extensive investigations in order to achieve these objects. As a result, they have discovered that when a place to be waterproofed, such as a road drainage construction or drainage facility and the edges thereof, is covered with and has liquid-tightly attached thereto a waterproof sheet composed primarily of a rubber sheet, preferably a silicone rubber sheet, that is reinforced with reinforcing fibers, has strong physical properties and, in particular, is semi-transparent, enabling the color of the waterproofed place to be discerned even after it has been covered, moisture infiltration to the waterproofed place is prevented, thereby guarding against deterioration or greatly retarding the progress of deterioration. The inventors have also found that by forming on one side of the rubber sheet a pressure-sensitive adhesive layer having an Asker C hardness of 15 or less, and in particular by forming a pressure-sensitive adhesive layer of low hardness and high tack that is composed primarily of silicone gel, the waterproof sheet conforms over a wider range than conventional products to the installed surface for waterproofing, enabling the waterproofing function to be maintained even after cracking and shifting have arisen in the installed surface.

Accordingly, the invention provides the following waterproof sheet and waterproofing method.

[1] A waterproof sheet comprising a base material layer and a pressure-sensitive adhesive layer formed on one side of the base material layer, wherein the base material layer comprises a rubber sheet reinforced with a reinforcing fiber layer and has a tensile strength of at least 15 MPa and a tear strength of at least 30 kN/m, and the pressure-sensitive adhesive layer has a hardness, as measured with an Asker C durometer, of 15 or less.

[2] The waterproof sheet of [1], wherein the rubber sheet that forms the base material to layer is made of a cured silicone rubber composition and the reinforcing fibers are of at least one type selected from the group consisting of glass fibers, carbon fibers, aramid fibers and silicon carbide fibers.

[3] The waterproof sheet of [1] or [2], wherein the reinforcing fiber layer is a plain-weave or satin-weave layer having a yarn count for both warp and weft of from 5 to 600 tex, a density of from 10 to 150 yarns/25 mm, a thickness of from 0.02 to 0.6 mm and a tension of at least 70 N/25 mm, and the sheet has a total light transmittance of from 50 to 99%.

[4] The waterproof sheet of any of [1] to [3], wherein the base material layer comprises a reinforcing fiber layer buried in a silicone rubber sheet and is obtained by applying a silicone rubber composition to each of the two sides of a cloth of reinforcing fibers and curing the rubber composition, which base material layer has a displacement when pulled in the surface direction of less than 5 mm at 25° C. and has a thickness of from 0.2 to 3 mm.

[5] The waterproof sheet of any of [1] to [4], wherein the pressure-sensitive adhesive layer is the cured form of an addition reaction-curable silicone composition, which cured composition has a hardness, as measured with an Asker C durometer, of not more than 15 and has a tack strength to a mortar test piece of at least 5 N/25 mm.

[6] The waterproof sheet of any of [1] to [5] wherein, one hour after attaching to a mortar test piece the waterproof sheet having a pressure-sensitive adhesive layer formed on the base material layer, the mortar test piece has a displacement when pulled in the surface direction of at least 10 mm.

[7] The waterproof sheet of any of [1] to [6], wherein the base material layer has a thickness of from 0.2 to 3 mm, the pressure-sensitive adhesive layer has a thickness of from 0.5 to 3 mm, the waterproof sheet has an overall thickness of from 0.7 to 6 mm, the waterproof sheet has a level of transparency such that, following attachment to an object, the color of the adherend can be discerned, and the sheet as a whole has a total light transmittance of from 50 to 99%.

[8] A method for waterproofing with a waterproof sheet, comprising the step of liquid-tightly covering, with the pressure-sensitive adhesive layer of the waterproof sheet of any of [1] to [7], a region that includes a place where moisture infiltration is to be prevented, and also liquid-tightly overlapping and attaching to the waterproof sheet an adjoining waterproof sheet such as to set the width of the overlap to at least 5 mm.

[9] The method of waterproofing with a waterproof sheet of [8], wherein the waterproof sheet is directly attached without a primer to the place where moisture infiltration is to be prevented, and at least some portion of the lateral ends and edges of the attached waterproof sheet is sealed.

[10] The waterproofing method of [8] or [9], wherein the place that is waterproofed with the waterproofing sheet is a parapet expansion joint.

[11] The waterproofing method of [8] or [9], wherein the place that is waterproofed with the waterproofing sheet is a region from a margin between a tank plate and a tank wall of an outdoor tank on a foundation to a surface of the tank plate and a surface of the foundation.

Advantageous Effects of Invention

The waterproof sheet provided by the invention includes a reinforcing layer and therefore is less likely to be damaged than conventional waterproof sheets. Also, because it has a pressure-sensitive adhesive layer on one side, it is capable of conforming to cracking and shifting of the installed surface. Moreover, when silicone is used as a primary ingredient, the sheet has excellent weather resistance, heat resistance and cold resistance, enabling it to continue functioning as a waterproof sheet over a longer period of time.

BRIEF DESCRIPTION OF DRAWINGS

FIG. 2 illustrates an exemplary method of waterproofing with the waterproof sheet of the invention, FIG. 2A being a perspective view showing parapet members arranged side-by-side with an expansion joint therebetween and FIG. 2B being a perspective view showing the parapet members covered with a waterproof sheet.

FIG. 3 illustrates another exemplary method of waterproofing with the waterproof sheet of the invention, FIG. 3A being a schematic cross-sectional diagram showing an outdoor tank with a waterproof sheet arranged so as to cover the tank, FIG. 3B being a schematic plan view of the same, and FIG. 3C being a cross-sectional view showing waterproof sheets in a mutually overlapping and bonded state.

DESCRIPTION OF EMBODIMENTS

The waterproof sheet of the invention is composed of a base material layer made of a rubber sheet reinforced with reinforcing fibers (reinforcing layer), and a pressure-sensitive adhesive layer formed on one side of the base material layer. The waterproof sheet has high-strength physical characteristics which, by liquid-tight attachment so as to cover at least part of an object at places that require waterproofing in, for example, drainage constructions or drainage facilities that include at least one type of structure from among concrete, mortar and metal structures, or in buildings, including, for example, the edges of structures built so that rainwater escapes though expansion gaps on a roadway, railroad or the like, factories and ordinary houses, can be effectively used to prevent moisture infiltration and guard against deterioration of the object or to retard the progress of deterioration over time.

To enable considerable shortening of the installation period, a type of waterproof sheet that has already been cured and formed into a sheet is preferable to a type that is cured at the worksite. From this standpoint, the waterproof sheet of the invention has a multilayer structure composed of a base material layer that includes a reinforcing layer, and a pressure-sensitive adhesive layer formed on one side of the base material layer, can be used for a long period of time, and has weather resistance. Moreover, it is preferable for the pressure-sensitive adhesive layer of the inventive waterproof sheet to be protected with a cover film when not in use or up until just prior to use.

The base material layer of the waterproof sheet of the invention, taking into consideration the handleability during sheet manufacture and installation, is preferably made of rubber (elastomer). In terms of heat resistance, weather resistance and cold resistance, exemplary types of elastomer include silicone rubbers, EPDM rubber, butyl rubber, chloroprene rubber and natural rubber. Assuming also that the service environment may range from frigid cold to scorching hot, silicone rubber is more preferred.

The silicone rubber sheet may be formed by using an organic peroxide-curable, addition reaction-curable, ultraviolet-curable or electron beam-curable silicone rubber composition and curing the composition. Although a composition of any curable type may be used in this case, given that molding can be carried out in a short time by heating, it is preferable for the silicone rubber sheet to be obtained from an addition reaction (hydrosilylation) curable silicone rubber composition or an organic peroxide-curable silicone rubber composition.

The organic peroxide-curable silicone rubber composition that is used may be one which includes an organopolysiloxane having at least two alkenyl groups per molecule and, as the curing agent, an organic peroxide in an amount effective for curing (generally from 1 to 10 parts by weight per 100 parts by weight of the organopolysiloxane). The organic peroxide is exemplified by acyl-type organic peroxides such as p-methylbenzoyl peroxide and o-methylbenzoyl peroxide, alkyl-type organic peroxides such as dicumyl peroxide and 2,5-dimethyl-2,5-bis(tert-butylperoxy)hexane, percarbonate-type organic peroxides and peroxyketal-type organic peroxides.

Addition curing is carried out by reacting, in the presence of a catalyst, an organosiloxane polymer having at least two alkenyl groups per molecule with a compound having at least two functional groups that react with alkenyl groups per molecule. The hydrosilylation reaction is a good example of such a case. This addition reaction-curable silicone rubber composition may be one that includes an alkenyl group-containing organopolysiloxane having at least two alkenyl groups (typically vinyl groups) per molecule, an organohydrogenpolysiloxane having two or more, preferably three or more, SiH groups (generally in an amount such that the molar ratio of SiH groups with respect to alkenyl group is from 0.5 to 4), and a platinum group metal-based addition reaction catalyst, such as platinum or a platinum compound (generally such that the amount of platinum group metal with respect to the alkenyl group-containing organopolysiloxane is from 1 to 1,000 ppm).

Ultraviolet vulcanization (also referred to as "ultraviolet curing" or "UV curing") is a method that irradiates a photopolymerization initiator-containing rubber compound with ultraviolet light having a wavelength of 200 to 400 nm and effects curing for a period of from several seconds to several tens of seconds. The irradiation wavelength is typically 254 nm or 365 nm. The photopolymerization initiator may be a known product, and is exemplified by Irgacure 184 (from BASF).

Electron-beam vulcanization (also referred to as "electron-beam curing" or "EB curing") is a method that artificially accelerates electrons and utilizes the energy of the accelerated electrons as a beam to induce curing. Curing is regulated by means of the acceleration voltage and the depth of penetration. The electron beam curing system is exemplified by those available from Iwasaki Electric Co., Ltd.

A commercial product may be used as the silicone rubber composition. Examples of organic peroxide-curable silicone rubber compositions include KE-971-U and KE-675-U from Shin-Etsu Chemical Co., Ltd. Examples of addition reaction-curable silicone rubber compositions include KE-551-U, KE-1990-50 and KE-1300T from Shin-Etsu Chemical Co., Ltd.

The rubber properties of the rubber sheet depend on the properties of the reinforcing layer for the base material as a whole, and thus are not particularly limited; they may be indicated as the rubber characteristics in the cured state. The aim here is preferably that the rubber sheet not be excessively sticky to the touch. The rubber properties, as measured by the methods according to JIS K6249, are preferably a Type A Durometer hardness of from 10 to 90, a tensile strength of 2 MPa or more, especially from 2 to 15 MPa, an elongation of 50 to 800%, and a tear strength of 2 kN/m or more, especially from 2 to 40 kN/m. Outside the above ranges in these properties, there is a possibility that scratches and other damage may readily arise at the surface of the waterproof sheet.

The base material includes a reinforcing layer made of reinforcing fibers. Structurally, the reinforcing layer may be laminated on the surface of the rubber sheet. However, in order for the sheet as a whole to be resistant to warping and distortion, it is preferable for a rubber sheet to be arranged on both sides of the reinforcing layer.

In this case, the base material may be formed by coating the base material rubber sheet-forming silicone rubber composition onto each side of the reinforcing layer made of reinforcing fibers and curing this silicone rubber composition. It is preferable to use a liquid composition as the silicone rubber composition and coat this onto both sides of the reinforcing layer so that the liquid composition penetrates the mesh of reinforcing fibers making up the reinforcing layer from both sides of the reinforcing layer, and to cure both liquid compositions in an integrally united state. This is desirable in that, by thus obtaining the base material in a state where the reinforcing layer is embedded within a silicone rubber base, the base material is integrally united and the sheet surface becomes resistant to peeling.

The reinforcing fibers are exemplified by glass fibers, carbon fibers, aramid fibers and silicon carbide fibers. It is preferable for at least one of these to be used. Although the fiber specifications are not particularly limited, it is desirable for the constituent yarn to have a count—both for the warp and for the weft—of from 5 to 600 tex, for the reinforcing fiber layer to have a density of from 10 to 150 yarns/25 mm, a thickness of from 0.02 to 0.6 mm and a tension of at least 70 N/25 mm. The reinforcing fiber layer preferably has, for example, a plain weave or satin weave construction. The fibers preferably have an appearance such that, when a sheet of the fibers is set down, the bottom side can be seen therethrough. It is desirable for the degree of transparency to be such that the total light transmittance, as measured according to JIS K7105, is set to preferably from 50 to 99%, and more preferably from 60 to 99%. At less than 50%, the transparency is lost. From the standpoint also of the decorativeness of the waterproof sheet, it is preferable for the sheet to have transparency.

The rubber sheet reinforced with the above reinforcing fibers has a tensile strength of 15 MPa or more and generally 100 MPa or less, preferably from 20 to 100 MPa, and more preferably from 50 to 100 MPa. The tear strength is 30 kN/m or more and generally 200 kN/m or less.

Figure 1:
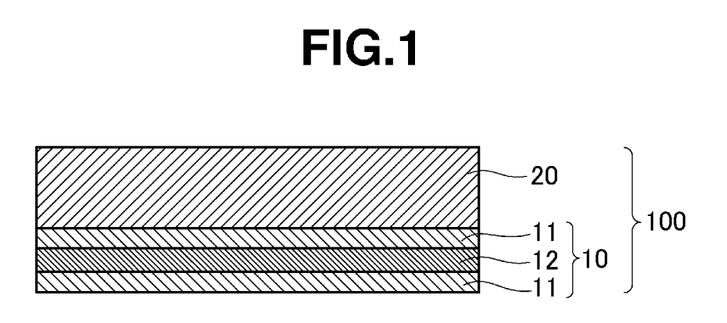
FIG. 1 is a cross-sectional view showing an embodiment of the waterproof sheet of the invention.

The waterproof sheet of the invention has a pressure-sensitive adhesive layer laminated onto the base material. In one embodiment shown in FIG. 1, the waterproof sheet 100 has a base material layer 10 obtained by laminating the rubber sheets 11, 11 described above to each side of a reinforcing layer 12 made of reinforcing fibers, and a pressure-sensitive adhesive layer 20 is laminated onto one of the rubber sheets 11. In this case, the two rubber sheets 11,11 preferably each penetrate into the reinforcing layer 12 and mutually interconnect at the interior of the reinforcing layer 12. The configuration of the base material is not limited to the embodiment shown in FIG. 1.

Hitherto known silicone compositions may be used here as the pressure-sensitive adhesive layer. The combinations thereof and the molding conditions differ in their ranges from those in the prior art, and have the following characteristics. The silicone composition is preferably an addition-curable silicone composition which includes the following ingredients and the cured form of which has surface tackiness:
(A) an organopolysiloxane containing at least two silicon-bonded alkenyl groups per molecule,
(B) a resinous copolymer which is preferably composed primarily of $R^2_3SiO_{1/2}$ units (wherein $R^2$ is a substituted or unsubstituted monovalent hydrocarbon group, with $R^2$ including an alkenyl group) and $SiO_2$ units,
(C) an organohydrogenpolysiloxane having at least two silicon-bonded hydrogen atoms (SiH groups), and
(D) an addition reaction catalyst,
The pressure-sensitive adhesive layer is preferably made of the cured form of the composition.

Component (A) of the addition-curable silicone composition is an organopolysiloxane having an average of at least two alkenyl groups per molecule. The organopolysiloxane used as component (A) may be one having average compositional formula (I) below.

$$R^1_a SiO_{(4-a)/2} \qquad (I)$$

In the formula, $R^1$ represents mutually like or unlike substituted or unsubstituted monovalent hydrocarbon groups of 1 to 10 carbon atoms, and preferably 1 to 8 carbon atoms; and the subscript a is a positive number in the range of 1.5 to 2.8, preferably 1.8 to 2.5, and more preferably 1.95 to 2.05. Here, silicon-bonded substituted or unsubstituted monovalent hydrocarbon groups represented by $R^1$ are exemplified by alkyl groups such as methyl, ethyl, propyl, isopropyl, butyl, isobutyl, tert-butyl, pentyl, neopentyl, hexyl, cyclohexyl, octyl, nonyl and decyl groups; aryl groups such as phenyl, tolyl, xylyl and naphthyl groups; aralkyl groups such as benzyl, phenylethyl and phenylpropyl groups; alkenyl groups such as vinyl, allyl, propenyl, isopropenyl, butenyl, hexenyl, cyclohexenyl and octenyl groups; and any of these groups in which some or all of the hydrogen atoms are substituted with halogen atoms such as fluorine, bromine and chlorine, cyano groups or the like, as exemplified by chloromethyl, chloropropyl, bromoethyl, trifluoropropyl and cyanoethyl groups. However, it is preferable for 90 mol % or more of all the $R^1$ groups to be methyl groups.

In this case, it is necessary for at least two of the $R^1$ groups to be alkenyl groups (in which the number of carbon atoms is preferably from 2 to 8, and more preferably from 2 to 6). The alkenyl group content is set to from 0.00001 to 0.05 mol/g, and preferably from 0.00001 to 0.01 mol/g, of all the organic groups $R^1$ (i.e., the above substituted or unsubstituted monovalent hydrocarbon groups). The alkenyl groups may be bonded to a silicon atom at the end of the molecular chain, may be bonded to a silicon atom partway along the molecular chain or may be bonded to both, although it is preferable to include alkenyl groups that are bonded to silicon atoms on both ends of the molecular chain. At an alkenyl group content below 0.00001 mol/g, sufficient rubber properties are not obtained; at a content greater than 0.05 mol/g, the hardness may be too high and the tack strength may decrease.

The degree of polymerization is not particularly limited, although it is preferable for the organopolysiloxane to be liquid at room temperature. In general, it is desirable to use an organopolysiloxane having a polystyrene-equivalent average degree of polymerization, as determined by gel permeation chromatography (GPC), of about 50 to 20,000, preferably about 100 to 10,000, and more preferably about 100 to 2,000.

This organopolysiloxane has basically a linear structure in which the main chain consists of repeating diorganosiloxane units ($R^1_2SiO_{2/2}$) and both ends of the molecular chain are capped with triorganosiloxy groups ($R^1_3SiO_{1/2}$) or hydroxydiorganosiloxy groups (($HO)R^1_2SiO_{1/2}$), although the structure may be partially branched, cyclic or the like.

The resinous copolymer (i.e., copolymer having a three-dimensional network structure) serving as component (B) is composed primarily of $R^2_3SiO_{1/2}$ units and $SiO_2$ units. Here, $R^2$ is a substituted or unsubstituted monovalent hydrocarbon group having preferably from 1 to 10 carbon atoms, and especially from 1 to 8 carbon atoms. Examples of monovalent hydrocarbon groups represented by $R^2$ include alkyl groups such as methyl, ethyl, propyl, isopropyl, butyl, isobutyl, tert-butyl, pentyl, neopentyl, hexyl, cyclohexyl, octyl, nonyl and decyl groups; aryl groups such as phenyl, tolyl, xylyl and naphthyl groups; aralkyl groups such as benzyl, phenylethyl and phenylpropyl groups; alkenyl groups such as vinyl, allyl, propenyl, isopropenyl, butenyl, hexenyl, cyclohexenyl and octenyl groups; and any of these groups in which some or all of the hydrogen atoms are substituted with halogen atoms such as fluorine, bromine and chlorine, cyano groups or the like, as exemplified by chloromethyl, chloropropyl, bromoethyl, trifluoropropyl and cyanoethyl groups.

The resinous copolymer serving as component (B) may be one consisting only of the above $R^2_3SiO_{1/2}$ units and $SiO_2$ units or, if necessary, it may include $R^2_2SiO$ units and $R^2SiO_{3/2}$ units ($R^2$ being as defined above) in a total amount thereof, based on the overall copolymer weight, of 50% or less, and preferably 40% or less. The molar ratio of $R^2_3SiO_{1/2}$ units and $SiO_2$ units, expressed as $R^2_3SiO_{1/2}/SiO_2$, is preferably from 0.5 to 1.5, and especially from 0.5 to 1.3. At a molar ratio smaller than 0.5 or larger than 1.5, a sufficient rubber hardness and strength are not obtained. In addition, the resinous copolymer serving as component (B) preferably has at least two alkenyl groups per molecule, the alkenyl group content being 0.0001 mol/g or more, and preferably in the range of 0.0001 to 0.001 mol/g. When the alkenyl group content is lower than 0.0001 mol/g, sufficient rubber properties are not obtained; when it is higher than 0.001 mol/g, the hardness may become too high and the tack strength may decline.

The resinous copolymer may be one which, at room temperature (25° C.), is in a liquid form having fluidity (e.g., 10 mPa·s or more, and preferably 50 mPa·s or more) or is in a solid form lacking fluidity. When the resinous copolymer is in a solid form, it may be in a state dissolved in an organic solvent such as toluene. This resinous copolymer can generally be prepared by hydrolyzing a suitable chlorosilane or alkoxysilane by a method known to the art.

Components (A) and (B) are included in the following amounts, assuming the total amount of components (A) and (B) to be 100 parts by weight. The amount of component (A) is in the range of 20 to 100 parts by weight, preferably 20 to 90 parts by weight, and especially 30 to 90 parts by weight. The amount of component (B) is in the range of 0 to 80 parts by weight, preferably 10 to 80 parts by weight, and especially 10 to 70 parts by weight. When the amount of component (A) is too low, i.e., when the amount of component (B) is too high, the rubber properties conspicuously decline. From the standpoints of the tackiness and strength, it is preferable to use component (B) together with component (A).

Component (C) is an organohydrogenpolysiloxane having at least two, and preferably three or more, silicon-bonded hydrogen atoms (SiH groups) that acts as a curing agent. The SiH groups on the molecule crosslink via hydrosilylation addition reactions with the silicon-bonded alkenyl groups in components (A) and (B), thereby curing the composition.

The organohydrogenpolysiloxane serving as this component (C) is represented by the following average compositional formula (II).

$$R^3{}_b H_c SiO_{(4-b-c)/2} \quad (II)$$

In the formula, $R^3$ is a substituted or unsubstituted monovalent hydrocarbon group of 1 to 10 carbon atoms. The subscript b is a positive number from 0.7 to 2.1, and the subscript c is a positive number from 0.001 to 1.0, such that these satisfy the condition that the sum b+c is from 0.8 to 3.0. Preferable use can be made of an organohydrogenpolysiloxane having at least two (generally, from 2 to 200), preferably from 3 to 100, and more preferably from 3 to 50, silicon-bonded hydrogen atoms per molecule. Here, the monovalent hydrocarbon group $R^3$ is exemplified by the same groups mentioned above for $R^1$, although it is preferable that the organohydrogenpolysiloxane have no aliphatic unsaturated groups. Also, b is preferably from 0.8 to 2.0, c is preferably from 0.01 to 1.0, and b+c is preferably from 1.0 to 2.5. The organohydrogenpolysiloxane has a molecular structure which may be linear, cyclic, branched, or a three-dimensional network structure. Preferred use can be made of an organohydrogenpolysiloxane that is liquid at room temperature (25° C.) and has a number of silicon atoms per molecule (or a degree of polymerization) of from 2 to 300, and especially from 4 to 150. The silicon-bonded hydrogen atoms may be positioned at the end of the molecular chain, may be positioned partway along the molecular chain, or may be positioned in both places, although an organohydrogenpolysiloxane having silicon-bonded hydrogen atoms at the ends of the molecular chain where the reaction rate is rapid is preferred. Examples thus include methylhydrogenpolysiloxanes capped at both ends with trimethylsiloxy groups, dimethylsiloxane/methylhydrogensiloxane copolymers capped at both ends with trimethylsiloxy groups, dimethylpolysiloxanes capped at both ends with dimethylhydrogensiloxy groups, dimethylsiloxane/methylhydrogensiloxane copolymers capped at both ends with dimethylhydrogensiloxy groups, copolymers consisting of $(CH_3)_2SiO_{1/2}$ units and $SiO_{4/2}$ units, and copolymers consisting of $(CH_3)_2HSiO_{1/2}$ units, $SiO_{4/2}$ units and $(C_6H_5)SiO_{3/2}$ units.

This organohydrogenpolysiloxane serving as component (C) is included in an amount, per 100 parts by weight of components (A) and (B) combined, of from 0.5 to 20 parts by weight, and especially from 1.0 to 10 parts by weight. When the content is too low or too high, a sufficient rubber strength cannot be obtained. This organohydrogenpolysiloxane serving as component (C) is included in an amount such that the amount of silicon-bonded hydrogen atoms (SiH groups) in component (C) with respect to the silicon-bonded alkenyl groups included in components (A) and (B), expressed as a molar ratio, is from 0.5 to 1.1, and preferably from 0.6 to 1.0. Assuming that the addition crosslinking reaction proceeds to 100% completion, the organohydrogenpolysiloxane is preferably included in an amount corresponding to from 0.005 to 0.010 mol/g.

Here, the molar ratio of SiH groups in component (C) with respect to the amount of alkenyl groups present within the system is expressed as H/Vi. Also, the "theoretical crosslinking amount" refers to the amount of crosslinking when silicon-bonded hydrogen atoms (SiH groups) within component (C) added to the system and alkenyl groups present in the system have 100% reacted. When the ratio H/Vi is 1 or less, the amount of SiH groups becomes the theoretical crosslinking amount; when H/Vi is 1 or more, the amount of alkenyl groups becomes the theoretical crosslinking amount. The amount of these functional groups may be an amount based on a computational formula during design of the composition, although using a measured value is more preferred. Measurement of the amount of functional groups is carried out by measuring either the amount of hydrogen gas that evolves or the amount of unsaturated groups, by NMR spectroscopy or the like according to a known method of analysis. The amount of functional groups within the system is expressed as X×Y mol/g, where the amount of functional groups within the molecule is X mol/g and the amount of addition is Y parts by weight.

Component (D) may be a catalyst that is known to the art. In general, one which includes a platinum group metal-based addition reaction catalyst such as platinum or a platinum compound (generally in an amount of from 1 to 1,000 ppm with respect to the total alkenyl group-containing organopolysiloxane of components (A) and (B)) may be used.

The pressure-sensitive adhesive layer has a hardness which is lower than the hardness of the base material rubber, the Asker C hardness being 15 or less, preferably 5 or less, and more preferably 1 or less. At more than 15, the tackiness may decrease. The lower limit is 0.

At an Asker C hardness of 5 or less, the measurement variability becomes large, and so it is more preferable to carry out measurement with an Asker CSR-2 durometer.

The pressure-sensitive adhesive layer obtained using a combination of above components (A) to (D) has a lower hardness than the base material layer, the hardness of the pressure-sensitive adhesive layer as measured with a CSR-2 durometer (Kobunshi Keiki Co., Ltd.) being preferably a positive number of 50 or less. The hardness is more preferably a positive number of 10 or more and 20 or less. Waterproof sheets having a pressure-sensitive adhesive layer as measured with an Asker C durometer (SRIS 0101 compliant; Kobunshi Keiki Co., Ltd.) of 1 or more have hitherto been supplied. The Asker C hardness of the pressure-sensitive adhesive layer in this invention is below 1, which is even lower.

The CSR-2 durometer is suitable for measuring hardnesses below an Asker C hardness of 1. This sensation is a level of hardness such that, when a tacky surface is touched with a finger and the finger is slowly moved away from the surface, the tacky surface follows the finger. It is advantageous for the pressure-sensitive adhesive layer to be given a lower hardness the higher the intended tack strength. However, in cases where the hardness measured with a CSR-2 durometer is lower than 3, when the adherend to which the waterproof sheet has been attached is a porous material such as asphalt or mortar, resolving the problem of excess softness and washing away of the pressure-sensitive adhesive layer is not easy. Another drawback is that the work of attaching the waterproof sheet becomes much more difficult. On the other hand, in cases where the hardness is higher than 20, the tack strength is not large, resulting in undesirably weak adhesion to the adherend. With practice, control of this hardness can be easily carried out by controlling the subsequently described molding and curing conditions.

The tack strength to a mortar test piece is used as the indicator of tackiness. A sheet fabricated by the subsequently described molding method is cut to a width of 25 mm, to the pressure-sensitive adhesive layer side of the sheet is attached to a mortar test piece (fabricated by Engineering Test Service in compliance with JIS R-5201; 50 mm (W)× 150 mm (L)×10 mm (T)) and left to stand at room temperature for 30 minutes, following which a 180° peel test is carried out at a peel rate of 300 mm/min. The tack strength at this time is preferably from 5 to 30 N/25 mm, and especially from 10 to 25 N/25 mm.

In addition, a sample created in the same way as above is immersed for 24 hours in tap water at room temperature. The sample is then taken out and the water droplets are removed, immediately after which a 180° peel test is carried out at a peel rate of 300 mm/min. The tack strength at this time is preferably from 5 to 20 N/25 mm. As a ready measure of the tack strength to a mortar test piece, at a tack strength of less than 5 N/25 mm, the sheet is easily peeled off by hand with a small force; at a tack strength of 5 N/25 mm or more, the sheet is not easily peeled off by hand.

Existing techniques of forming a surface having tackiness include that of manifesting tackiness by surface-treating one side of a simple structure using, for example, plasma, a flame or an acid or base, and that of laminating a pressure-sensitive adhesive layer onto a base material layer by dipping, coating, screen printing or the like. However, in this invention, such techniques are undesirable, both because the hardness is difficult to control and because the low hardness that is desired cannot be obtained.

In addition to the above-described ingredients, where necessary, other ingredients may be included in the compositions that form the above base material rubber layer and the pressure-sensitive adhesive layer. Examples of such other ingredients include fillers such as fumed silica, precipitated silica, quartz powder, diatomaceous earth and calcium carbonate; electroconductive materials such as carbon black, conductive zinc white and metal powders; and heat-resisting materials such as iron oxide and cerium oxide. In addition, hydrosilylation reaction regulators such as nitrogen-containing compounds, acetylene compounds, phosphorus compounds, nitrile compounds, carboxylates, tin compounds, mercury compounds and sulfur compounds, internal mold release agents such as dimethyl silicone fluids, tackifiers, and thixotropic agents may be optionally included.

The waterproof sheet has a thickness of preferably from 0.7 to 6 mm, and more preferably from 0.7 to 3.5 mm. Of this thickness, the thickness of the base material layer is from 0.2 to 3 mm, and preferably from 0.2 to 1.5 mm. A base material layer thickness of less than 0.2 mm may be insufficient to take full advantage of the sheet elasticity; a base material layer thickness of more than 3 mm may result in a higher weight, may adversely affect attachment of the waterproof sheet, or may be disadvantageous in terms of cost. The pressure-sensitive adhesive layer has a thickness which is preferably in the range of 0.5 to 3 mm, and more preferably in the range of 0.5 to 2 mm. At less than 0.5 mm, the waterproof sheet cannot absorb surface irregularities on the adherend to which the pressure-sensitive adhesive layer is attached; at more than 3 mm, the rubber strength on the bonding side of the sheet becomes dependent on the pressure-sensitive adhesive layer and so there is a possibility of rubber failure arising.

The method of forming the waterproof sheet is described. The rubber layer is integrally united with the reinforcing fibers that form the reinforcing layer by dipping, coating, calendering, screen printing or the like, thereby giving the base material layer. In this case, calendering can be suitably used and is thus preferred.

The pressure-sensitive adhesive layer is laminated onto the base material layer. The pressure-sensitive adhesive layer may be formed following formation of the base material layer by curing of the base material layer-forming composition. Alternatively, the base material layer-forming composition may be sheeted by calendering onto a film of polyethylene terephthalate (PET) or the like, and the pressure-sensitive adhesive layer-forming composition may be laminated in the uncured state onto the reinforcing layer.

One method for obtaining a laminated sheet involves dipping, coating or screen printing the pressure-sensitive adhesive layer-forming composition onto the base material layer-forming composition, this method being preferred because coating formation can be suitably used. The conditions for such curing are preferably a temperature of from 80 to 250° C. for a period of from 10 seconds to one hour. In addition, post-curing at 120 to 250° C. for about 1 to 100 hours may be carried out for such purposes as to remove low-molecular-weight components.

Here, the waterproof sheet obtained has a displacement when the base material layer alone is pulled in the planar direction of, as mentioned above, less than 5 mm. However, 24 hours after attaching to a mortar test piece the waterproof sheet obtained by forming a pressure-sensitive adhesive layer on the base material layer, the displacement when both sides of the test specimen created by attaching the waterproof sheet to a mortar test piece are set in an autograph and the mortar test piece is pulled in the planar direction at a rate of 50 mm/min is 10 mm or more, preferably from 10 to 50 mm, and even more preferably from 15 to 30 mm. At a displacement smaller than 10 mm, the followability worsens and a waterproof performance may not be exhibited.

As mentioned above, the thickness of the base material layer is from 0.2 to 3 mm, the thickness of the pressure-sensitive adhesive layer is from 0.5 to 3 mm, and the overall thickness of the waterproof sheet is from 0.7 to 6 mm. Yet, this waterproof sheet, after being attached to an object, has a level of transparency that enables the color of the adherend to be discerned, and the total light transmittance of the overall sheet is preferably from 50 to 99%, and more preferably from 60 to 99%. At less than 50%, the color of the adherend is difficult to discern.

Here, the waterproof sheet of the invention can be used by attaching the pressure-sensitive adhesive layer onto an object in order to prevent the infiltration of moisture such as rainwater. One example of a method for doing so is described.

Figure 2A:
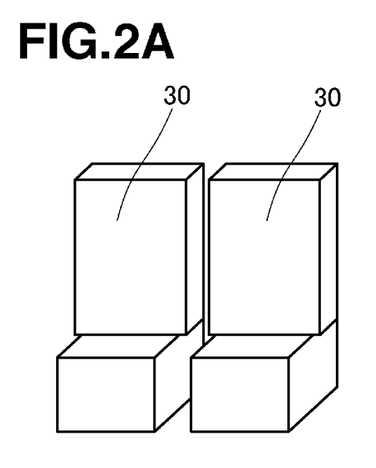
Figure 2B:
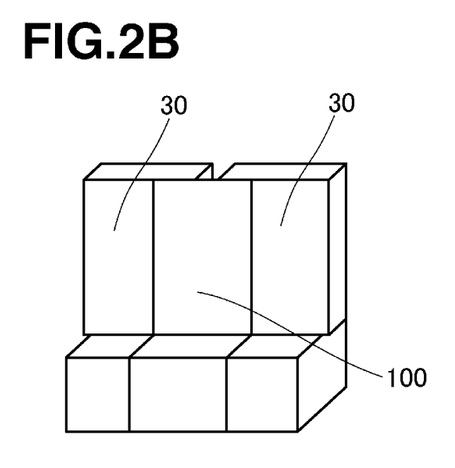

The expansion joints in a parapet installed on a highway or the like serve to regulate expansion and contraction of the road due to heat and cold. Because these expansion joints are pathways for discharging moisture such as rainwater away from the roadway, as shown in FIG. 2, a waterproof sheet 100 is laid down so as to straddle parapet sections 30, 30. The bottom of the parapet is connected to a portion of the roadway, and so one can fully conceive of vehicle tires riding over the waterproof sheet that has been laid down. Vehicles being heavy objects, the high-speed rotational movement of their tires brings very large forces to bear on the waterproof sheet. The waterproof sheet of the invention that is reinforced with a reinforcing layer has a high strength and is resistant to damage by these very large forces.

Figure 3A:
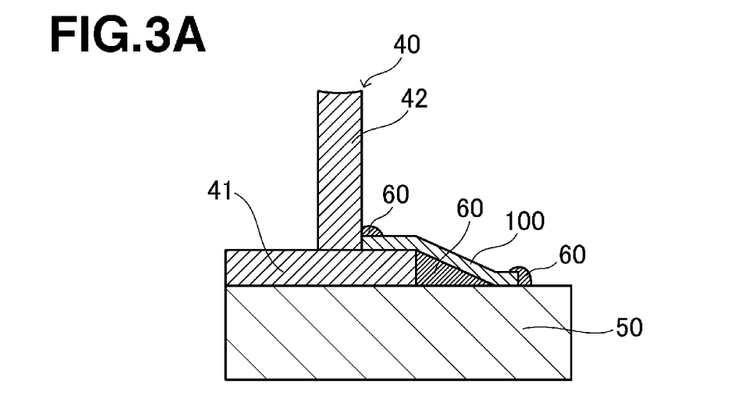
Figure 3B:
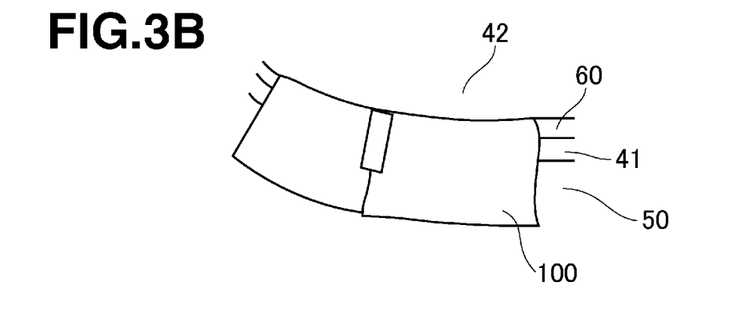
Figure 3C:
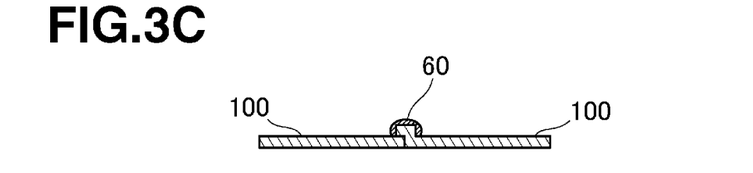

Also, as shown in FIG. 3, in a waterproof sheet 100 for preventing rainwater infiltration to a boundary region between the bottom side and the foundation portion of an outdoor tank 40, one can imagine an area where a waterproof sheet has been laid down serving as a passageway and people passing through, either for maintenance checks or routinely. The possibility of the waterproof sheet failing when repeatedly stepped on is conceivable, but the waterproof sheet of the invention has a high strength and does not easily fail.

Describing more fully the method for installing the waterproof sheet in FIG. 3, a tank plate 41 is installed on a foundation 50. Also shown is a tank wall 42. The contents held within the tank 40 may be, for example, petroleum, asphalt or various types of gases. The tank 40 is generally cylindrical and of a size that is typically, but not limited to, a diameter of from 10 to 80 meters and a height of from 10 to 50 meters. When installing the waterproof sheet 100, a sealant 60 is applied for the purpose of filling in the step between the tank plate 41 and the foundation 50. The waterproof sheet 100 is stretched so as to extend from a margin between the tank plate 41 and the tank wall 42 to the surface of the tank plate 41, the surface of the sealant 60 and the surface of the foundation 50. In addition, the sealant 60 can be applied both to the tank plate side and the foundation side edge of the waterproof sheet 100.

The portion of the waterproof sheet that is to be attached may be pre-treated so as to make the sheet easy to attach. However, because the waterproof sheet has tackiness, the portion of the waterproof sheet that is to be attached does not always need to be pre-treated. Attachment is carried out by using the tacky surface as the side to be attached. In cases where a step arises at the boundary portion and the side to be attached will presumably be subjected to excessive stress, it is preferable to carry out a means for eliminating the step. Exemplary methods for doing so include laying down mortar on the step or using a backup material.

As mentioned above, when liquid-tightly covering with the waterproof sheet an area that includes places where moisture infiltration is to be prevented, it is preferable to attach the adjoining waterproof sheet by liquid-tightly overlapping it so as to set the width of the overlapping portion to 5 mm or more, preferably from 5 to 25 mm, and especially from 10 to 20 mm.

In the practice of this invention, the waterproof sheet may be attached directly without a primer.

Although it is not always necessary to use a sealant when attaching the waterproof sheet, to more securely attach the sheet, a sealant may be used at boundary portions of the sheet and at areas where one sheet is bonded to another. The sealant is not particularly limited; use may be made of any suitable known sealant, such as silicone, polysulfide or polyurethane-type sealants. However, in terms of affinity with the waterproof sheet material of the invention, the use of a silicone sealant is preferred. Commercial products may be used as such sealants. For example, use may be made of silicone sealants such as Sealant Master 300, Sealant 70 and Sealant 701 from Shin-Etsu Chemical Co., Ltd.

By using a waterproof sheet having tackiness as the waterproof sheet of the invention, primer-less application is possible, enabling the installation period to be greatly shortened.

Up until now, in most cases, sealant has been directly applied or waterproofing has been specially carried out. However, in cases where there are hot and cold differences due to the climate, or where there is a lot of moisture such as rain or snow on account of the weather and condensation forms, application is impossible until the surface to which the sheet is to be applied dries. By using the waterproof sheet of the invention, application can be carried out without a primer. Therefore, even when moisture remains on the surface to which the sheet is to be attached, application is possible merely by adequately wiping the surface with a rag or the like. Hence, this has the groundbreaking feature of enabling installation of the sheet to begin immediately after the weather has recovered.

Because the waterproof sheet of the invention exhibits a waterproof function owing to tack strength, it can be easily peeled away and the interior examined simply by removing the seal portion for securing the end of the sheet. Moreover, in cases where it has transparency, the interior can be examined even without peeling off the sheet, in which case it is not even necessary to remove the seal portion for securing the end of the sheet.

Another major feature is that, even after being reattached, the waterproof sheet can exhibit a waterproof function with the re-tack strength.

EXAMPLES

The invention is illustrated more fully below by way of Working Examples and Comparative Examples, although the invention is not limited by these Examples. In the Examples below, parts are by weight.

Working Example 1

A base material layer A having an average thickness of 0.35 mm was obtained by using a coater to apply, as an addition reaction-curable silicone rubber composition, a mixture/dispersion of the liquid silicones KE-1300T/CAT-1300-L2=10/1 (both products of Shin-Etsu Chemical Co., Ltd.) to both sides of an IPC Spec 1080 glass cloth (thickness, 0.23 mm; yarn count, 400T; warp density, 19 yarns/25 mm; weft density, 19 yarns/25 mm; warp tension, 450 N/25 mm; weft tension, 350 N/25 mm; plain weave; total light transmittance, 51%; manufactured by Nitto Boseki Co., Ltd.), and heating and curing for 15 minutes at 150° C. in a curing oven.

In a separate operation, a 50 wt % toluene solution containing 92.5 parts of a dimethylpolysiloxane capped at both ends with dimethylvinylsiloxy groups and having an average degree of polymerization of 1,000 and 7.5 parts of a resinous copolymer consisting of $(CH_2=CH)(CH_3)_2SiO_{1/2}$ units, $(CH_3)_3SiO_{1/2}$ units and $SiO_2$ units [$((CH_2=CH)(CH_3)_2SiO_{1/2}$ units+$(CH_3)_3SiO_{1/2}$ units)/$SiO_2$ units (molar ratio)=0.85; $CH_2=CH-$ group content, 0.0008 mol/g] that is a solid at room temperature (25° C.) was placed in an agitator/mixer and mixed for 30 minutes, following which the toluene was completely distilled off (alkenyl group content, 0.00865 mol/g). To 100 parts of this silicone base was added 6.0 parts of a SiH group-containing resinous copolymer composed primarily of $(CH_3)_2HSiO_{1/2}$ units and $SiO_2$ units (SiH group content, 0.0013 mol/g) as a crosslinking agent and 0.1 part of ethynyl cyclohexanol as a reaction regulator, and stirring was continued for 15 minutes, thereby giving Silicone Rubber Composition A. Next, 0.2 part of a platinum catalyst (Pt concentration, 1 wt %) was mixed into this silicone rubber composition, giving Pressure-Sensitive Adhesive Silicone Composition A.

Using a comma coater, Pressure-Sensitive Adhesive Silicone Composition A was lamination coated to a thickness of 1.0 mm onto Base Material Layer A and heated and cured for 5 minutes at 140° C. in a heating oven, giving a four-layer Laminated Cured Sheet A. The resulting laminated cured sheet had an average thickness of 1.35 mm.

The results of evaluations by the subsequently described methods are presented in Table 1. The evaluation methods used for each of the Working Examples and Comparative Examples below were the same as in Working Example 1.

Working Example 2

Silicone Rubber Composition B was obtained as an addition reaction-curable silicone rubber composition by adding 1.0 part of C-19A and 2.5 parts of C-19B (both products of to Shin-Etsu Chemical Co., Ltd.) as vulcanizing agents to KE-551-U (Shin-Etsu Chemical Co,. Ltd.) and kneading on a two-roll mill. The kneaded material was calendered such as to obtain a 0.5 mm thick sheet on a 100 μm embossed PET film and laminated using a calendering roll onto one side of an IPC Spec 1080 glass cloth identical to that used in Working Example 1, following which 15 minutes of heating and curing was carried out at 150° C. in a curing oven. Next, using a calendering roll, Silicone Rubber Composition B was sheeted so as to obtain a 0.5 mm thick sheet on a 100 μm embossed PET film and laminated onto the other side of the glass cloth not yet laminated with a silicone rubber layer, following which 15 minutes of heating and curing was carried out at 150° C. in a curing oven, thereby giving a Base Material Layer B having an average thickness of 1.1 mm.

The embossed PET film on one side was peeled off, and Pressure-Sensitive Adhesive Composition A like that in Working Example 1 was lamination coated thereon and cured under applied heat, thereby giving a 4-layer Laminated Cured Sheet B having an average thickness of 2.1 mm.

Working Example 3

Aside from using the meta-aramid fiber Conex (Teijin Techno Products Ltd.) instead of IPC Spec 1080 glass cloth, the same procedure was carried out as in Working Example 1, giving a 4-layer Laminated Cured Sheet C having an average thickness of 1.3 mm.

Comparative Example 1

An addition reaction-curable silicone rubber composition was obtained by adding the vulcanizing agents C-19A (1.0 part) and C-19B (2.5 parts) (both products of Shin-Etsu Chemical Co., Ltd.) to the millable dimethyl silicone rubber compound KE-675-U (Shin-Etsu Chemical Co., Ltd.), following which the composition was kneaded on a two-roll mill. This was followed by calendering, thereby sheeting the kneaded composition such as to obtain a 1.0 mm thick sheet on a 100 μm embossed PET film, giving a silicone rubber composition in the form of an uncured sheet (base material layer).

The embossed PET film on one side was peeled off and Pressure-Sensitive Adhesive Composition A identical to that in Working Example 1 was lamination coated thereon, following which the base material layer and the pressure-sensitive adhesive layer were heated and cured, giving a two-layer Laminated Cured Sheet D having an average thickness of 1.8 mm.

Comparative Example 2

Base Material Layer A was obtained in the same way as in Working Example 1. However, the average thickness was set to 0.5 mm and this was prepared as a three-layer Laminated Cured Sheet E.

Comparative Example 3

Base Material Layer A was obtained in the same way as in Working Example 1.

In a separate procedure, a 50 wt % toluene solution containing 92.5 parts of a dimethylpolysiloxane capped at both ends with dimethylvinylsiloxy groups and having an average degree of polymerization of 1,000 and 7.5 parts of a resinous copolymer consisting of $(CH_2=CH)(CH_3)_2SiO_{1/2}$ units, $(CH_3)_3SiO_{1/2}$ units and $SiO_2$ units [$((CH_2=CH)(CH_3)_2SiO_{1/2}$ units+$(CH_3)_3SiO_{1/2}$ units)/$SiO_2$ units (molar ratio)=0.85; $CH_2=CH-$ group content, 0.0008 mol/g] that is a solid at room temperature (25° C.) was placed in an agitator/mixer and mixed for 30 minutes, following which the toluene was completely distilled off (alkenyl group content, 0.00865 mol/g). To 100 parts of this silicone base was added 8.0 parts of a SiH group-containing resinous copolymer composed primarily of $(CH_3)_2HSiO_{1/2}$ units and $SiO_2$ units (SiH group content, 0.0013 mol/g) as a crosslinking agent and 0.1 part of ethynyl cyclohexanol as a reaction regulator, and stirring was continued for 15 minutes, thereby giving Silicone Rubber Composition B. Next, 0.2 part of a platinum catalyst (Pt concentration, 1 wt %) was mixed into this silicone rubber composition, giving Pressure-Sensitive Adhesive Composition B.

Using a comma coater, Pressure-Sensitive Adhesive Composition B was lamination coated to a thickness of 1.0 mm onto Base Material Layer A and heated and cured for 5 minutes at 140° C. in a heating oven, giving a four-layer Laminated Cured Sheet F having an average thickness of 1.35 mm.

Comparative Example 4

Use was made of Guardflon (Tokai Aluminum Foil Co., Ltd.), which is obtained by additionally laminating a synthetic rubber-based pressure-sensitive adhesive layer onto a base material layer having a structure composed of aluminum foil and a protective film laminated onto a fluorocarbon resin.

Evaluation Tests

[Transparency]

Following installation, sheets for which the color of the adherend can be discerned were rated as "O"; sheets for which the color could not be discerned were rated as "X." In addition, the total light transmittance was measured in accordance with JIS K7105.

Measurement Apparatus: the direct-reading Haze Computer HGM-2,
from Suga Test Instruments Co., Ltd.

[Strength]

Sheets having a tensile strength of 30 MPa or more and a tear strength of 50 kN/m or more were rated as "O"; sheets which did not satisfy one of these criteria were rated as "Δ"; and sheets that satisfied neither criterion were rated as "X."

[Followability]

The pressure-sensitive adhesive layer of a waterproof sheet sample having a 50 mm×100 mm shape was attached onto one side of two mortar test pieces arranged side-by-side, in such a way as to cover uniform surface areas, and then left to stand at room temperature for 24 hours. When pulled up to a maximum of 20 mm from zero span, samples for which the displacement that follows such pulling without peeling of the sheet was 10 mm or more were rated as "O"; those with a displacement of 5 to 10 mm were rated as "Δ"; and those with a displacement of less than 5 mm were rated as "X."

Measurement Apparatus: Shimadzu Autograph; peel rate, 50 mm/min;
mortar test piece shape: 50 mm×72 mm×10 mm (T)

[Waterproof Performance]

In the following three tests, when the results for all three were "O," the rating for waterproof performance was "O"; when one or two were "O," the rating was "Δ"; when all three were "X," the rating was "X."

Waterproofness:

Evaluation of the waterproofness was carried out using a waterproof sheet obtained as described above and having a height of 20 cm and a length of 100 cm. This waterproof sheet was laid down continuously as shown in FIG. 3 over the boundary areas between the foundation and the tank plate of an outdoor tank. Using Sealant-Master-300 as the sealant, each waterproof sheet was bonded at this time to the member to be protected or to the foundation over a region up to 2 cm from the outer periphery of the sheet.

When no rainwater infiltration occurred over a one-month period in the outdoor environment after installation of the sheet, the waterproofness was rated as "O"; when rainwater infiltration occurred, the waterproofness was rated as "X."

Long-Term Waterproofness:

When no rainwater infiltration occurred over a six-month period in the outdoor environment after installation of the sheet, the waterproofness was rated as "O"; when rainwater infiltration occurred, the waterproofness was rated as "X."

Degree of Bonding Following Immersion in Water:

A 30 mm×50 mm shaped waterproof sheet sample was attached to the top side of a mortar test piece and left to stand for 24 hours at room temperature. The test sample was set inside a vat, placed at rest with the mortar portion immersed in tap water and the waterproof sheet sample not directly immersed in tap water, and left to stand at room temperature (water depth, 5 to 7 mm). When no peeling was observed even after 24 hours had elapsed, the degree of bonding was rated at "O"; when peeling was observed within 24 hours, the degree of bonding was rated as "X."

Mortar Test Piece Shape: 50 mm×150 mm×10 mm (T)

REFERENCE SIGNS LIST

10: Base material layer
11: Rubber composition (sheet)
12: Reinforcing fibers (reinforcing layer)
20: Pressure-sensitive adhesive layer
100: Waterproof sheet
30: Parapet
41: Tank plate
42: Tank wall
50: Foundation
60: Sealant

The invention claimed is:

1. A waterproof sheet comprising a base material layer and a pressure-sensitive adhesive layer formed on one side of the base material layer, wherein the base material layer comprises a rubber sheet reinforced with a reinforcing fiber layer and has a tensile strength of at least 15 MPa and a tear strength of at least 30 kN/m, and the pressure-sensitive adhesive layer has a hardness, as measured with an Asker C durometer, of below 1, and wherein the reinforcing fiber layer is a plain-weave or satin-weave layer having a yarn count for both warp and weft of from 5 to 600 tex, a density of from 10 to 150 yarns/25 mm, a thickness of from 0.02 to 0.6 mm and a tension of at least 70 N/25 mm, and the sheet has a total light transmittance of from 50 to 99%.

2. The waterproof sheet of claim 1, wherein the rubber sheet that forms the base material layer is made of a cured silicone rubber composition and the reinforcing fibers are of at least one type selected from the group consisting of glass fibers, carbon fibers, aramid fibers and silicon carbide fibers.

TABLE 1

| | Working Example | | | Comparative Example | | | |
|---|---|---|---|---|---|---|---|
| | 1 | 2 | 3 | 1 | 2 | 3 | 4 |
| Base material layer | Base Material A | Base Material B | Base Material C | Base Material D | Base Material A | Base Material A | |
| Rubber layer | liquid silicone | millable silicone | liquid silicone | millable silicone | liquid silicone | liquid silicone | butyl rubber |
| Reinforcing layer | glass fibers | glass fibers | aramid fibers | none | glass fibers | glass fibers | aluminum foil |
| Pressure-sensitive adhesive layer | Pressure-Sensitive Adhesive Composition A | Pressure-Sensitive Adhesive Composition A | Pressure-Sensitive Adhesive Composition A | Pressure-Sensitive Adhesive Composition A | none | Pressure-Sensitive Adhesive Composition B | none |
| Thickness (mm) | 1.35 | 2.1 | 1.3 | 1.8 | 0.5 | 1.35 | 0.7 |
| Transparency | ○ | ○ | ○ | X | ○ | ○ | X |
| Total light transmittance (%) | 71 | 68 | 61 | 0 | 71 | 71 | 0 |
| Strength | ○ | ○ | ○ | X | ○ | ○ | ○ |
| Properties of base material alone | | | | | | | |
| Hardness (Type A) | 74 | 55 | 74 | 61 | 74 | 74 | 88 |
| Tensile strength (MPa) | 79 | 75 | 81 | 7.3 | 79 | 79 | 75 |
| Elongation (%) | 2 | 3 | 2 | 430 | 2 | 2 | 10 |
| Tear strength (kN/m) | 350 | 340 | 500 | 14 | 350 | 350 | 200 |
| Properties of pressure-sensitive adhesive layer | | | | | | | |
| Hardness (Asker C) | <1 | <1 | <1 | <1 | — | 20 | — |
| Hardness (Asker CSR-2) | 14 | 14 | 14 | 14 | — | 70 | — |
| Tack strength to mortar (N/25 mm) | 18 | 20 | 19 | 20 | — | 3 | 20 |
| Followability | ○ | ○ | ○ | ○ | X | X | X |
| Displacement (mm) | 20 | 20 | 20 | 20 | 2 | 8 | 3 |
| Waterproof performance | ○ | ○ | ○ | ○ | Δ | Δ | Δ |
| Waterproofness | ○ | ○ | ○ | ○ | ○ | ○ | ○ |
| Long-term waterproofness | ○ | ○ | ○ | ○ | X | X | ○ |
| Degree of bonding after immersion in water | ○ | ○ | ○ | ○ | X | X | X |

3. The waterproof sheet of claim 1, wherein the base material layer comprises a reinforcing fiber layer buried in a silicone rubber sheet and is obtained by applying a silicone rubber composition to each of the two sides of a cloth of reinforcing fibers and curing the rubber composition, which base material layer has a displacement when pulled in the surface direction of less than 5 mm at 25° C. and has a thickness of from 0.2 to 3 mm.

4. The waterproof sheet of claim 1, wherein the pressure-sensitive adhesive layer is the cured form of an addition reaction-curable silicone composition, which cured composition has a tack strength to a mortar test piece of at least 5 N/25 mm.

5. The waterproof sheet of claim 1 wherein, one hour after attaching to a mortar test piece the waterproof sheet having a pressure-sensitive adhesive layer formed on the base material layer, the mortar test piece has a displacement when pulled in the surface direction of at least 10 mm.

6. The waterproof sheet of claim 1, wherein the base material layer has a thickness of from 0.2 to 3 mm, the pressure-sensitive adhesive layer has a thickness of from 0.5 to 3 mm, the waterproof sheet has an overall thickness of from 0.7 to 6 mm, the waterproof sheet has a level of transparency such that, following attachment to an object, the color of the adherend can be discerned, and the sheet as a whole has a total light transmittance of from 50 to 99%.

7. A method for waterproofing with a waterproof sheet, comprising the step of liquid-tightly covering, with the pressure-sensitive adhesive layer of the waterproof sheet of claim 1, a region that includes a place where moisture infiltration is to be prevented, and also liquid-tightly overlapping and attaching to the waterproof sheet an adjoining waterproof sheet such as to set the width of the overlap to at least 5 mm.

8. The method of waterproofing with a waterproof sheet of claim 7, wherein the waterproof sheet is directly attached without a primer to the place where moisture infiltration is to be prevented, and at least some portion of the lateral ends and edges of the attached waterproof sheet is sealed.

9. The waterproofing method of claim 7 or 8, wherein the place that is waterproofed with the waterproofing sheet is a parapet expansion joint.

10. The waterproofing method of claim 7 or 8, wherein the place that is waterproofed with the waterproofing sheet is a region from a margin between a tank plate and a tank wall of an outdoor tank on a foundation to a surface of the tank plate and a surface of the foundation.

11. A waterproof sheet comprising a base material layer and a pressure-sensitive adhesive layer formed on one side of the base material layer, wherein the base material layer comprises a rubber sheet reinforced with a reinforcing fiber layer and has a tensile strength of at least 15 MPa and a tear strength of at least 30 kN/m, and the pressure-sensitive adhesive layer has a hardness, as measured with an Asker C durometer, of below 1, and wherein the base material layer has a thickness of from 0.2 to 3 mm, the pressure-sensitive adhesive layer has a thickness of from 0.5 to 3 mm, the waterproof sheet has an overall thickness of from 0.7 to 6 mm, the waterproof sheet has a level of transparency such that, following attachment to an object, the color of the adherend can be discerned, and the sheet as a whole has a total light transmittance of from 50 to 99%.

* * * * *